March 19, 1946. O. W. FROST ET AL 2,396,996
APPARATUS FOR MAKING CURVED CELLULOSIC SHEETS
Filed Aug. 18, 1943  5 Sheets-Sheet 2
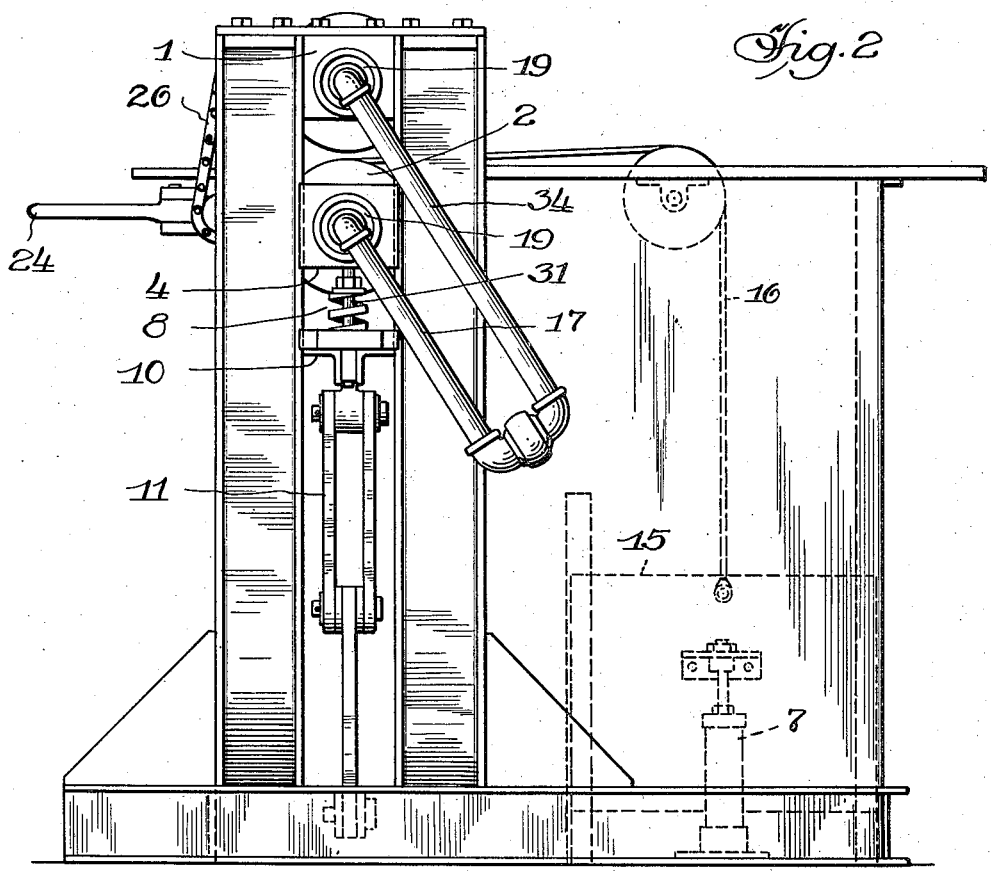
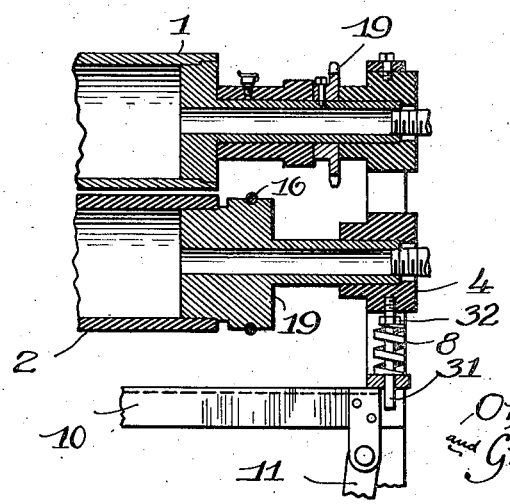
INVENTORS.
Orcutt W. Frost,
and Grant S. Willey March 19, 1946.  O. W. FROST, ET AL  2,396,996
APPARATUS FOR MAKING CURVED CELLULOSIC SHEETS
Filed Aug. 18, 1943   5 Sheets-Sheet 3

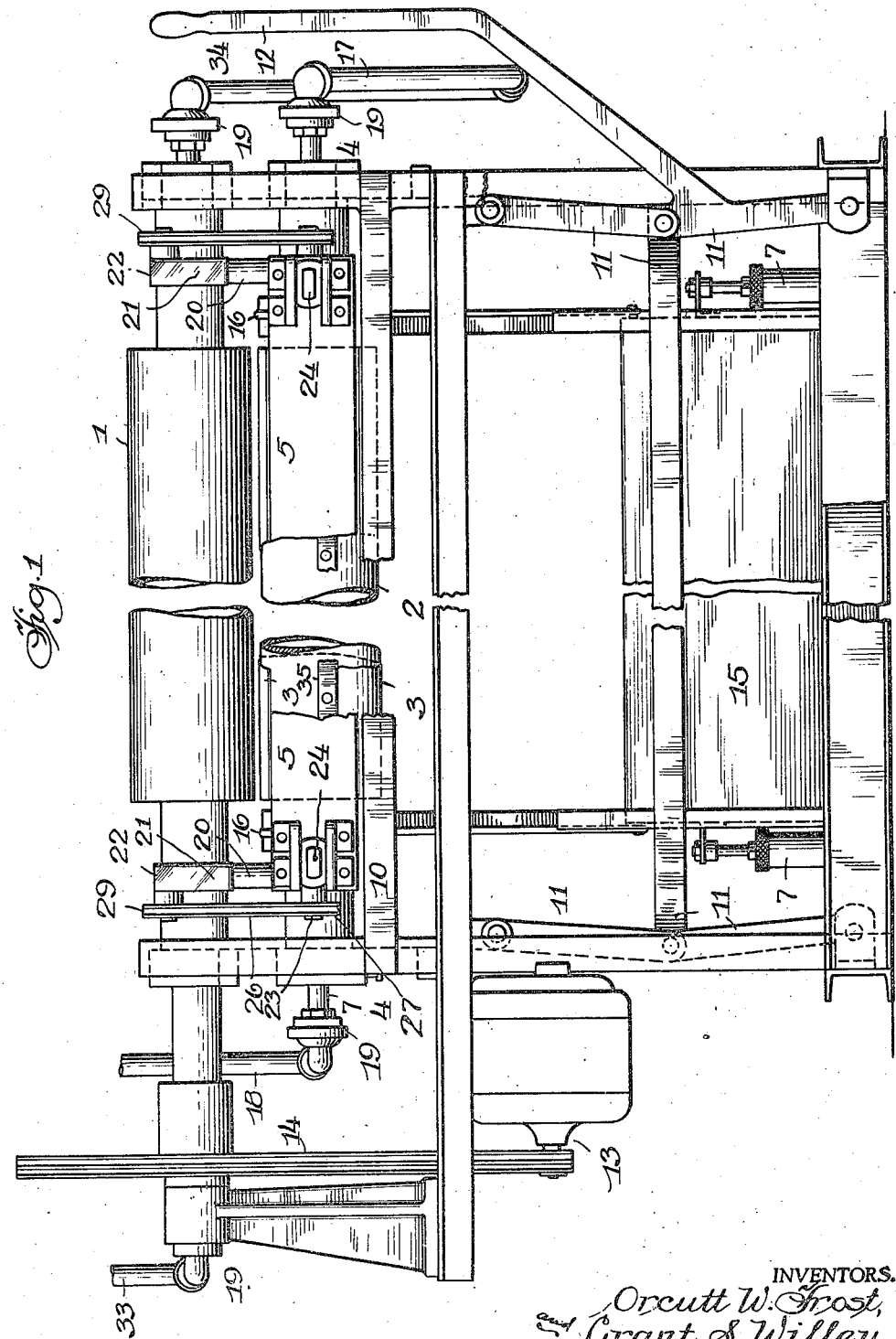

INVENTORS.
Orcutt W. Frost
Grant S. Willey
Richard Ericson

March 19, 1946. O. W. FROST ET AL 2,396,996
APPARATUS FOR MAKING CURVED CELLULOSIC SHEETS
Filed Aug. 18, 1943   5 Sheets-Sheet 4

INVENTORS.
Orcutt W. Frost
and Grant S. Willey
Richard Grierson

March 19, 1946.  O. W. FROST ET AL  2,396,996
APPARATUS FOR MAKING CURVED CELLULOSIC SHEETS
Filed Aug. 18, 1943    5 Sheets-Sheet 5
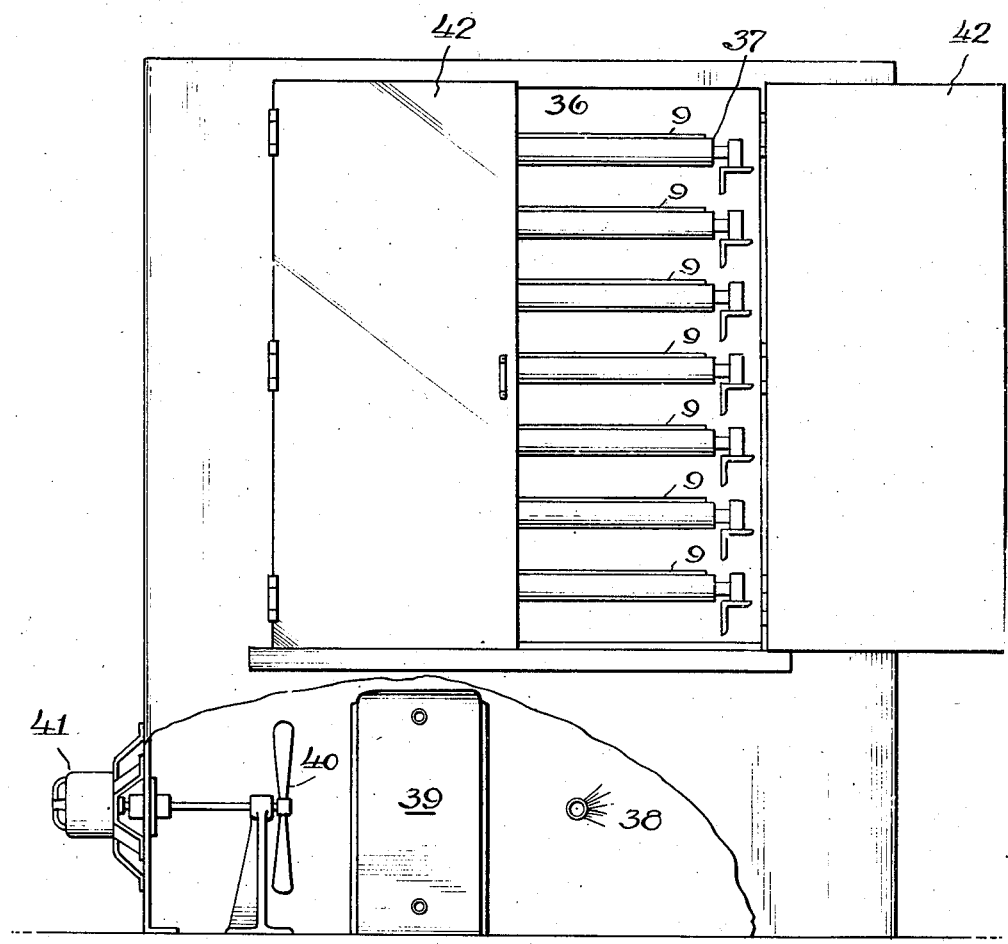
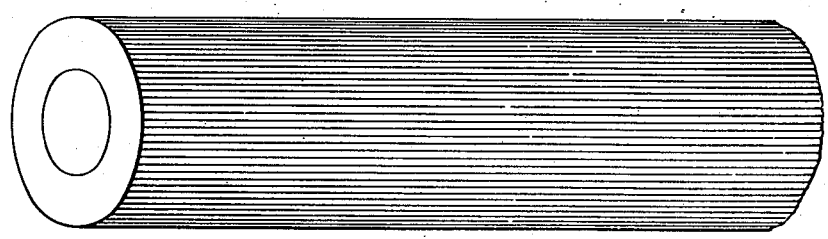
INVENTORS.
Orcutt W. Frost
and Grant S. Willey
By Richard Erison Atty Patented Mar. 19, 1946

2,396,996

UNITED STATES PATENT OFFICE 2,396,996

APPARATUS FOR MAKING CURVED CELLULOSIC SHEETS

Orcutt W. Frost, Highland Park, and Grant S. Willey, Chicago, Ill., assignors to United States Gypsum Company, Chicago, Ill., a corporation of Illinois Application August 18, 1943, Serial No. 499,096

8 Claims. (Cl. 18—19)

This invention pertains to an apparatus for preparing cellulosic sheets in curved shapes.

Wood has been formed into curved shapes in the past usually by steaming or soaking in water, followed by forming and drying around a mold of the desired shape. Also, cellulosic curves of various types have been made by first previously conditioning the material with moisture and mechanically forcing it around a heated mandrel and holding in place until set by the heat. All of these methods are slow and incapable of high speed production. Also, they do not form surfaces which are smooth on both sides and are not very well suited for the bending of certain types of material such as hardboard.

It is the purpose of this invention to form curved cellulosic sheets which have improved properties and to set forth an apparatus by which such a product may be formed.

While the apparatus which is the subject of this invention can be used to form improved curves or bends in any sheet material formed from cellulose such for example as wood veneer, fiber insulation board or other cellulosic sheets, it has been found very well adapted for bending hard dense cellulosic materials known as hardboard, a dense cellulosic sheet formed by applying heat and pressure to sheets made from wood pulp. Hence, this material will be used to illustrate the process and apparatus which will be subsequently described in detail. While such material is used in the example it is the intention not to limit the scope of this invention thereby but to all cellulosic or thermo-plastic material in sheet form which by minor adjustments in the process or apparatus can be satisfactorily formed into shapes having curved or irregular contours.

It has been discovered that in order to consistently form a curved sheet free from cracks or irregular surfaces the following is necessary.

1. The heat must be applied to both surfaces of the sheet during the bending operation at the point of bend.
2. The bend must take place substantially at the point of pressure.
3. A metal sheet or strap in tension must bear against the convex or tension side of the sheet being bent.

Attempts to rapidly bend cellulosic sheet material in the past to give a commercially operatable process have failed because one or more of the above essential steps have been omitted.

One method of bending a cellulosic sheet following the above principle is by the use of two horizontally disposed heated pressure rollers. A metal strip or strap is attached to and around the lower roll passing through the nip of the rolls to a bending bar to which it is attached. The bending bar moves in a concentric arc around one of the rolls and at the same speed. Thus when a cellulosic sheet is placed between the rolls heat and pressure are applied at the point of bend, which is at the nip or points of contact of the rolls, and a sheet is firmly held against the convex or tension side of the bend during the entire bending operation. A complete description of such an apparatus is as follows:

In the drawings:

Figure 1 is a front view of the entire machine showing the rolls in position to receive a board.

Figure 2 is an end view of the entire machine also in position to receive a board in preparation for bending.

Figure 10 is a section view through the bending rolls and shows the means of introducing heating fluid to the rolls and the means for elevating and lowering the bottom roll.

Figure 11 illustrates a corrugated forming mandrel to facilitate the bending of the sheet material. Figure 11A is an enlarged view of these projections and more clearly shows one type of projection which can be used.

Figure 12 illustrates a humidifying device for adding hygroscopic moisture to the sheet material.

Figure 4:
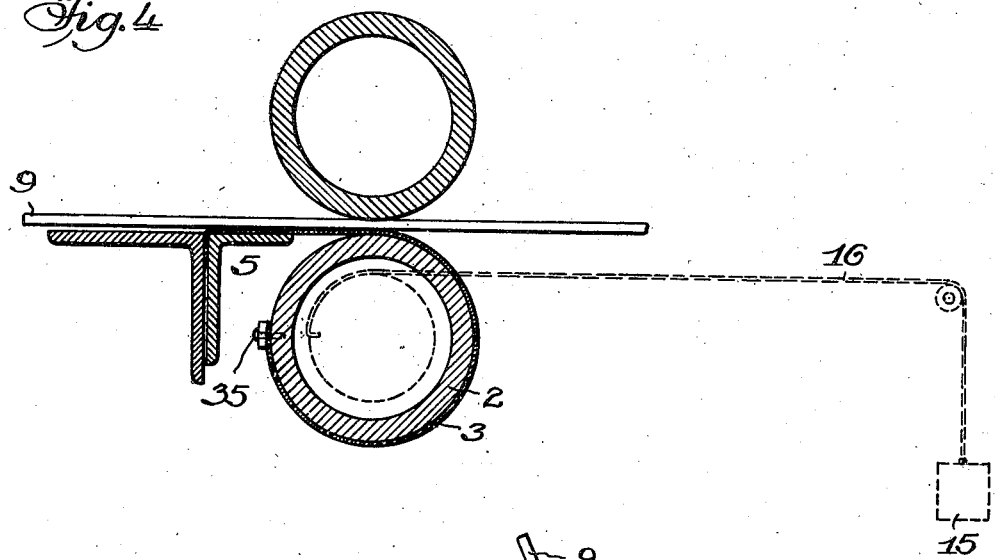
Figure 4 is also a diagrammatic, partly sectional view through the machine showing the board in position for bending and after bending by movement of the pressing roll around the forming mandrel.

In the drawings, 1 is the top heated roll and 2 the bottom heated roll to which is attached the tension metal band 3 by means of the plate 35. After making nearly a complete turn around the bottom roller the band 3 passes through the nip or contact between the rollers 1 and 2 and is attached to the forming or bending bar 5 which may comprise two angles joined together for the purpose of clamping the ends of the band 3 firmly in place. The end of the band 3 has deep serration 6, see Fig. 3, at this end in order to prevent wrinkling when heated. At the start of the bending operation it is preferred that the bending bar 5 be positioned slightly below the level of the top surface of the bottom roll 2 such as about an angle of 5°. In Fig. 10 the bearings 4, for the bottom roll 2 are slidably mounted so that the bottom roll 2 can be raised or lowered to facilitate the introduction and removal of the sheet inserted between the rolls. In Figs. 2 and 10 the spring 8 applies the desired degree of pressure to the bearing 4 supporting the bottom roll 2 against the sheet 9 which is being bent. The spring 8 and bearing 4 are attached to the cross member 10 by means of the pin 31 which is threaded above the spring. The nut 32 can be turned to adjust the tension upon the spring 8.

The cross member 10 supporting the bottom roll 2 and its bearing 4 is raised and lowered by the toggle movement 11 actuated by the hand lever 12, see Figure 1. The top roll 1 is driven by the motor 13 through the drive 14. The bottom roll 2 is not directly driven but depends for its power upon friction contact with the specimen 9 through the metal sheet 3, and from the band 3 as it is pulled around the roll 1. In order to maintain tension upon the metal sheet 3 during the pressing operation and to return the roll 2 to the starting position after each bend a counter weight 15 is attached to the roll 2 through the cables 16, see Fig. 2. The counter weight is prevented from returning the roll too fast by the dash pot 7.

The rolls 1 and 2 are heated, and while this can be done in many ways, such as by steam or electrical means, the preferred source is circulating hot oil. The hot oil from a heat exchanger, not shown, enters the roll 1 through the pipe 33 and out the pipe 34 whence it passes through the pipe 17 into the roll 2 and out the pipe 18 and hence to the heat exchanger for reheating and reuse. Suitable packing glands 19 are provided so that the rolls may turn while the pipes remain stationary without leaking of oil taking place.

Figure 5:
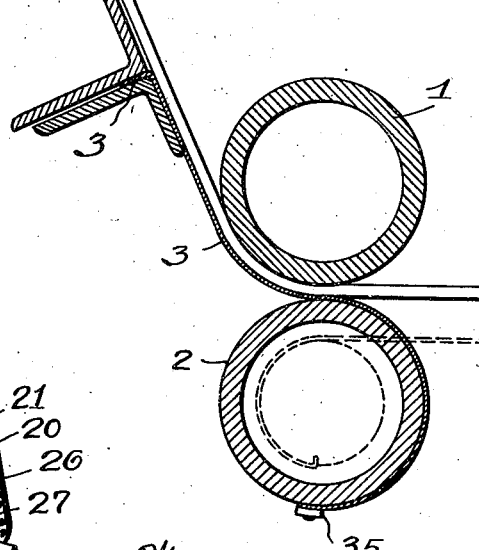
Figure 5 is a view similar to 4 but showing the board during the course of a bend.
Figure 3:
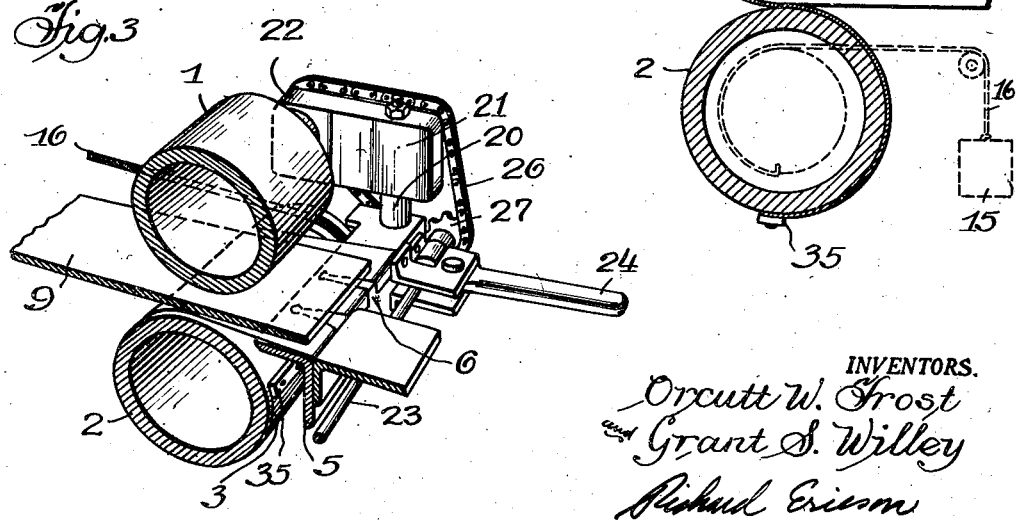
Figure 3 is in perspective a sectional view through the machine showing the board in the position for starting the bend. The drive for the bending bar is also shown in this figure.
Figure 6:
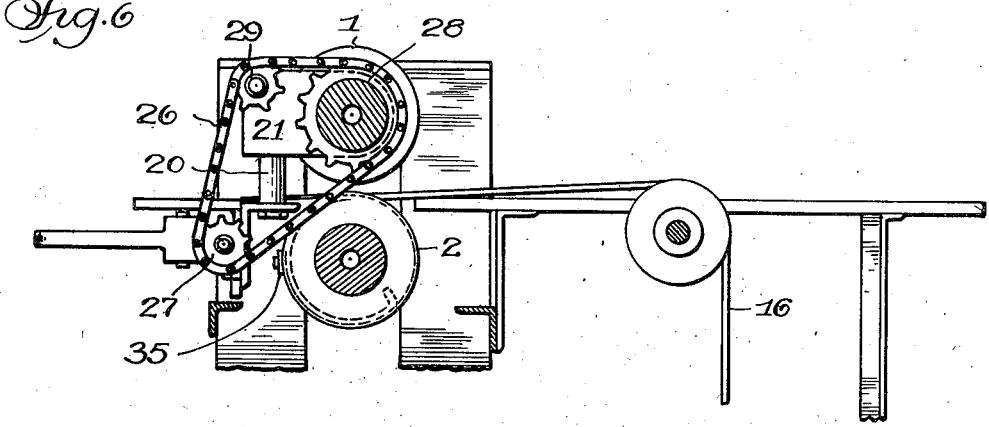
Figure 6 shows the entire drive mechanism for the bending bar just before the starting of a bend.
Figure 7:
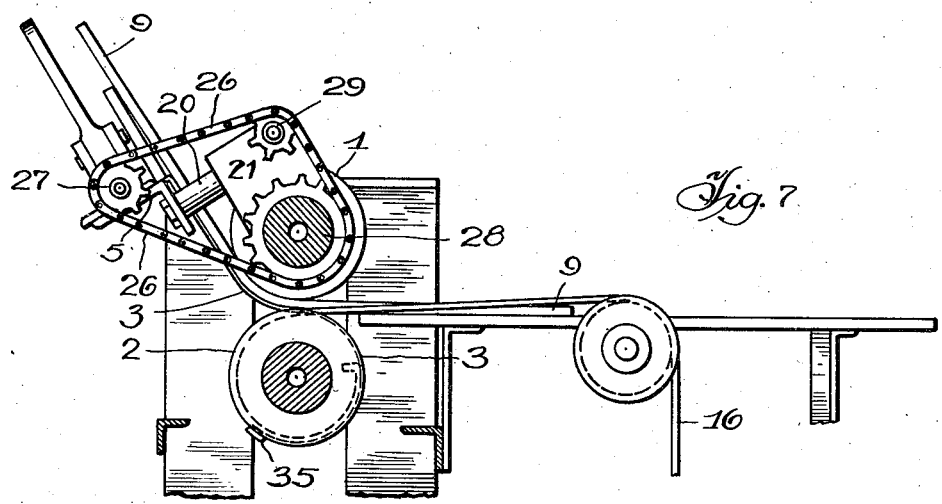
Figure 7 is similar to 6 only shows the mechanism in one of the stages of operation during the bending of the board.
Figure 8:
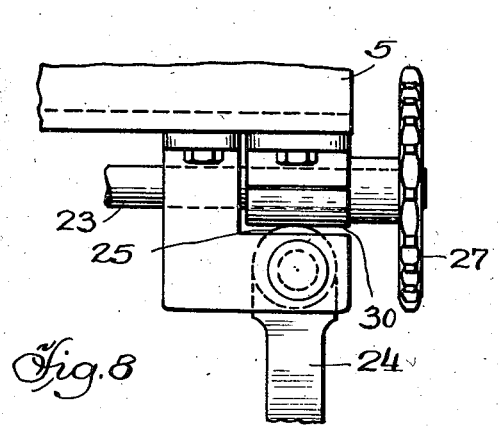
Figures 8 and 9 show top and end view of a clamping means which sets the bending means in operation.
Figure 9:
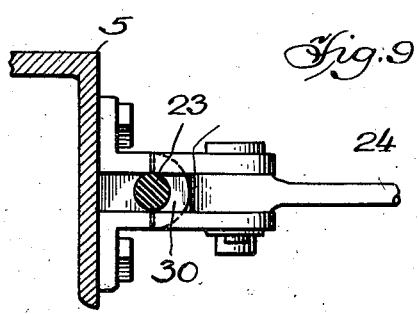

When the board 9 has been inserted between the heated rolls 1 and 2 as shown in Figs. 3 and 4 it is now ready for bending. The roll 2 is firmly held against the specimen by means of the springs 8. The bending bar 5 moves in an arc around the top roll 1 and as it does so it carries the end of the board around with it as shown in Figs. 5 and 7. The roll 1 turns with the board and at the same speed so that there is no movement between the two surfaces. The board is thus firmly formed locked against and around the top roll 1 by pressure applied by the metal strip or sheet 3 attached at one end to the forming bar 5 and at the other end to the bottom roll 2 at the point 35. The sheet 3 is held in tension by counter weight attached to the bottom roll. Thus the four essential elements required to obtain a satisfactory bend are provided. These are (1) a forming mandrel (2) heat on both sides of the sheet during forming and concentrated at the point of bend (3) pressure applied at the point of bend and (4) bending strap in tension applied to the exterior or tension side at and near the point of bend.

The bending bar 5 is attached to the radius arm 21 by means of the pin 20. This arm rests upon the roller 1 by means of the bearing 22. Thus the radius arm and roller are free to turn with respect to each other.

The bending bar 5 is turned by stopping the shaft 23 by turning the brake arm 24. This arm which has a cam 25 at one end presses against the split bearing 30 causing it to stop the shaft 23. When this takes place the chain 26 driving sprocket 27 is stopped. Sprocket 28 attached to roll 1 still turns thus the chain through the idler sprocket 29 now acts in such a manner as to pull the bending bar in an arc around the roll 1 and at the same speed as roll 1. When the chain 26 is not stopped, such as by applying a brake to the shaft 23, it passes freely around the sprocket 27 over the idler sprocket 29 and around the driving sprocket 28, thus causing no movement of the board to take place.

The bend cannot be made too fast otherwise cracking will take place; a bend of 90° from 35 to 40 sec. has been found satisfactory. Obviously this speed can be varied if desired. If the speed is too fast insufficient heat transfer to the board results and an unsatisfactory bend is obtained.

When the bend has progressed to the extent desired the bending operation can be stopped preferably by stopping the top roll 1 or by releasing the force against the split bearing 30 thus permitting the chain 26 to revolve the sprocket 27 thus stopping the arcuated movement of the bending bar.

A full U bend can be made upon the machine as shown. Practically a complete circle could be made if desired simply by providing means to remove the bent board from the end of the roll. If a curve substantially in excess of 180° is desired the rolls should be placed in a vertical position so that one bearing could be readily removed to facilitate removal of the curved sheet.

When hardboard is bent it has been found desirable to have the full amount of hygroscopic moisture obtained within the sheet. Treating at 90° F. and 90% relating humidity for 48 hours has been found suitable. It is not necessary and is undesirable to thoroughly wet the board; substantially complete humidification is all that is required.

Figure 12 illustrates an apparatus for humidifying the hardboard sheets 9. In the drawing 36 is a humidifying chamber in which is mounted roller section 37 for supporting the hardboards 9. The increase in humidity is obtained by discharging steam from the nozzle 38. Additional heat is added from the steam heating coils 39. Force circulation of air is obtained from the fan 40 driven by the motor 41. The humidity in the chamber can be determined from wet and dry bulb thermometers not shown. The necessary adjustments in conditions can then be made by controlling the quantity of steam permitted to escape into and in the amount of heat added to the chamber. Doors 42 are provided to facilitate loading and unloading the chamber.

A temperature of about 500° F. upon the surface of the rolls has been found sufficient though this can be varied somewhat with satisfactory results.

It may be found expedient in the case of smaller forming rolls to crown the top, bottom or both rolls slightly in order to compensate for its deflection during the pressing operation. In the case of a roll of 6″ in diameter and 6′ 6″ in length a crown of .050″ in the center over the diameter of the roll at the ends was found to be enough. If a much smaller roll is used it will be found desirable to place a bearing in the center and on top of the roll to prevent undue deflection thereby providing uniform contact between the bending and kneading surfaces and the sheet to be bent. This deflection can also be minimized by the use of a larger bottom or pressing roll.

While the above described machine has been found very desirable for bending cellulosic materials such as hardboard, it is not the intention to limit this invention to the particular apparatus disclosed; for obviously, other devices which may or may not be modification of this machine can be used to carry out satisfactorily the principles set forth in this invention. For example, it may be within the scope of this invention to have the forming roll on the bottom and the pressing roll on the top or to place the rolls with their axes vertical and to use springs in places of the counter weight for returning the pressing roll. It is not necessary that the forming mandrel be round, for any reasonable curved surface which it is desired to simulate in the hardboard or cellulosic sheet, can be used.

One of the reasons that this process and the above apparatus, which is a preferred example of means by which this process can be carried out and which forms a part of this invention, is very well adapted to the bending of hardboard, is that it does not have the high tensile strength of wood and hence cannot be as readily bent by the old conventional methods requiring steaming as small cracks as well as complete fracture will take place. Also, the use of steam to soften the surface followed by the old method of forming around a mandrel and permitting the sheet to dry, particularly in the case of hardboard, causes an unsightly irregular surface. By not applying the heat substantially before bending and by applying the metal sheet to the surface, moisture evaporation is prevented so that the hygroscopic moisture is sufficient to effect the bend. The evenly applied pressure of this apparatus renders it very suitable for hardboard.

A hardboard made upon this machine will have a smooth highly ironed surface at the bend. It will not have the raised or rough fibers on the surface experienced when steamed or water soaked board are bent by the old or conventional ways.

It is within the scope of this invention to have the forming bar 5 stationary, see Figure 4, and the pressing roll 2 to follow an arcuated movement or epicylic train-like movement around the stationary forming mandrel 1 thus bending the board against the mandrel and unwinding the forming sheet 3 and holding it against the sheet 9 to be bent during the progress of the bend; the position of the various elements after the bend is shown in broken lines. This is the reverse of the procedure given in the above example. Upon examination it will be seen that this modification still follows the principle set forth in this invention.

1. There is a progressive bending of the board.
2. Heat is supplied to both surfaces to be bent and at the point of bend.
3. Pressure is also supplied at the point of bend.
4. A pressing sheet or strap in tension bears against the convex or tension side of the sheet being bent.
5. There is substantially no relative movement between the sheet being bent and the pressing or forming sheet and the mandrel.
6. The forming sheet is in tension and anchored at one end and unwinding at the other end from a pressing roll.
7. There is a forming mandrel and a pressing roll.
8. The forming mandrel can be of other shape than round.
9. The hygroscopic moisture is not dissipated sufficiently to interfere with the bend.
10. There is an arcuated movement of the bending device around the mandrel and locking a pressing strap or sheet against the mandrel.

An outstanding advantage of this invention is that it is not necessary to leave the boards on the machine curved around the mandrel to obtain a permanent set, for that such is immediately obtained is proven by the fact that a board can be immediately removed after bending and the curve is uniform throughout the entire extent of the board.

In the bending of cellulosic sheet material, such as hardboard, the inner or concave surface shrinks or compresses while the outer surface expands. This invention is very well adapted to take advantage, especially in thick sheets or in short bends, of the principle of aiding the compression of the inner surface by the use of very small ridges, flutes, corrugations or other types of projections in the surface of the forming mandrel which embeds into the surface of the sheet at the point of bend, see Figures 11 and 11A. This will form a bend freeer from the danger of splitting near the center or neutral axis of the sheet. The corrugations or other types of projections must be so designed that they will not permit too excessive escape of moisture vapor. For example, in a bend around a mandrel 3" in diameter corrugations in the surface about .008" deep and .125" wide and substantially parallel with the axis of the mandrel will be found to aid in the bending of some materials.

To summarize, the preparing of a bend by this method consists of applying heat to both sides particularly the outside of the cellulosic sheet and at the point of bend, the use of pressure at this point of bend, a sheet like member in tension firmly placed against the tension side of the board being bent and a heated mandrel about which the sheet is to be bent and conforming to the shape desired. Any apparatus which conforms to the above process is within the scope of this invention. It is of course essential that the bend be made with an evenly applied force. A jerky irregular application of the bending force will cause cracking to take place.

Having disclosed a practical embodiment of our invention and specific examples, theories and uses which are given to insure a clear understanding of the essence of this invention, it is not the intention to be limited thereby for obviously many variations may be made by those skilled in the art and still be within the scope of this invention which is only limited in extent by the forthcoming claims.

It is claimed:

1. A board bending machine comprising two heated rotary contact members engaging both sides of the board to be bent at the point of bend and under pressure, one of said rotary members acting as a forming mandrel while the other rotary member having means for applying and releasing pressure against said board at the point of bend, a sheetlike member under tension wound around and attached to said other rotary contact member at one end and attached to a bending bar at the other end, said bar disposed beyond said other rotary member, a driving means for moving said bar in an arc concentric with and in the same direction and speed as said forming mandrel, and synchronous driving means for said rotary contact members and said bending bar whereby said board to be bent is progressively advanced through said rotary contact members, and bent and locked against said mandrel by pressure from said sheetlike member unwinding from said other rotary member throughout the entire course of the bend without substantial differential movement between the board and said forming surfaces.

2. A board bending machine comprising two heated rotary contact rolls engaging both sides of the board to be bent at the point of bend and under pressure, one of said rolls acting as a forming mandrel while the other roll provided with means for applying and releasing pressure against said board at the point of bend, a sheetlike member having one end wound around and attached to said other roll, restoring torque means on said other roll to furnish tension to said sheetlike member and to return said sheetlike member to starting position, a bending bar disposed beyond said other roll to which is attached the other end of said sheetlike member, a driving means for moving said bar in an arc concentric with and in the same direction and speed as said forming mandrel, and synchronous driving means for said rolls and said bending bar whereby said board to be bent is progressively advanced through said roll members, bent, and locked against said mandrel roll by pressure from said sheetlike member throughout the entire course of the bend without substantial differential movement between the board and said forming surface.

3. A hardboard bending machine comprising two heated rotary contact parallel moving rolls engaging both sides of the board to be bent at the point of bend and under pressure, one of said rolls acting as a forming mandrel the other as a pressing roll with means for releasing said pressure, a sheetlike member having one end serrated and the other end wound around and attached to said pressure roll, a counter weight attached to said pressure roll to furnish tension to said sheetlike member and to return said sheetlike member and said roll to starting position after the completion of a bend, a bending bar disposed beyond said pressure roll to which is attached said serrated end of said sheetlike member in tangential relation to said pressure roll and forming an angle at the starting position with the plane passing through the axis of both rolls which is slightly less than 90° on the pressing roll side, a driving means for moving said bar in an arc concentric with and in the same direction and speed as said forming mandrel and simultaneously with the rotary movement of said rolls whereby said board to be bent is progressively advanced through said rolls and simultaneously locked against said mandrel roll by pressure from said sheetlike member throughout the entire course of the bend without substantial differential movement between the board and said forming surface.

4. A hardboard bending machine comprising two heated rotary, parallel moving, contact rolls engaging both sides of the board to be bent at the point of bend and under pressure, one of said rolls acting as a forming mandrel and having driving means, the other as a pressing roll with means for releasing said pressure, a sheetlike member having one end serrated and the other end wound around and attached to said pressure roll substantially for its entire length, a restoring torque acting on said pressure roll to furnish tension to said sheetlike member and to return said sheetlike member and said roll to starting position after the completion of a bend, a bending bar disposed beyond said pressure roll to which is attached said serrated end of said sheetlike member, a sprocket attached to a free moving shaft forming part of said bending bar and driven by a chain from a sprocket attached to said mandrel roll, an idler sprocket forming a part of said forming bar and driven by said chain, a brake for stopping the shaft attached to said forming bar whereby said forming bar is moved in an arc concentric with and in the same direction as said mandrel roll causing said sheetlike member to bend and lock said sheet against said mandrel roll as said sheet passes through the heated contact zone and remained so locked without differential movement between the board and the forming surface throughout the entire bend.

5. In a hardboard bending machine the combination of a heated forming mandrel and a heated pressure roll, a forming sheet attached to said pressure roll and to a bending bar, means for driving said bending bar, said heated forming mandrel, said heated pressure roll, and said forming sheet, whereby the sheet to be bent passes between said forming sheet and said forming mandrel and is bent and locked to said mandrel by said forming sheet held in tension throughout the entire progress of the bend.

6. Claim 2 in which said forming roll and said bending bar is stationary and said pressing roll is driven to form an epicyclic train with said stationary forming roll or mandrel.

7. Claim 2 in which the heated mandrel has small projections extending from its face to facilitate compressing the inner surface during bending.

8. A board bending machine comprising two rotatable heated, pressure contact members, one of said contact members acting as a forming mandrel; the other contact member having means for applying and releasing pressure; a sheet-like flexible member attached to said pressure contact member and thereabout; the other end of said sheet-like flexible member attached to a bar, a tension applying means acting through said pressure contact member to keep said sheetlike member under tension; driving means for simultaneously advancing said sheet-like member in juxtaposition around said forming mandrel and unwinding said sheet-like member from said pressure contact member, whereby the board to be bent is progressively advanced and bent around said forming mandrel by pressure from said pressure contact member and locked against said forming mandrel by pressure from said sheet-like member unwinding from said pressure contact member throughout the entire course of the bend without substantial differential movement between said board to be bent and said forming mandrel substantially as described.

ORCUTT W. FROST.
GRANT S. WILLEY.